(12) United States Patent
Mallek

(10) Patent No.: US 6,357,256 B1
(45) Date of Patent: Mar. 19, 2002

(54) AIR CONDITIONER FOR PASSENGER TRANSPORTATION VEHICLES

(75) Inventor: Andreas Mallek, Renningen (DE)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/692,864

(22) Filed: Oct. 23, 2000

(30) Foreign Application Priority Data

May 24, 2000 (DE) .......................................... 200 09 332

(51) Int. Cl.[7] .............................................. F25B 39/04
(52) U.S. Cl. .......................................... 62/507; 62/509
(58) Field of Search .......................... 62/509, 507, 244

(56) References Cited

U.S. PATENT DOCUMENTS

| | | | | |
|---|---|---|---|---|
| 5,005,372 A | * | 4/1991 | King ............................ | 62/244 |
| 5,088,294 A | * | 2/1992 | Ando ........................... | 62/119 |
| 5,184,474 A | * | 2/1993 | Ferdows ....................... | 62/244 |
| 5,592,830 A | * | 1/1997 | Baba et al. ................... | 62/509 |
| 5,901,573 A | * | 5/1999 | Kobayashi .................... | 62/507 |
| 5,946,938 A | * | 9/1999 | Balthazard .................... | 62/507 |

* cited by examiner

*Primary Examiner*—William C. Doerrler

(57) ABSTRACT

To provide an air conditioner for passenger transportation vehicles, in particular, for buses, comprising a refrigerant circuit including at least one condenser unit, through which the refrigerant flows in several heat exchanger coils connected parallel to one another, and a collecting flask receiving refrigerant condensed in the condenser unit and serving to compensate the fluctuations in the refrigerant volume occurring during operation of the air conditioner, wherein the collecting flask is accommodated in a space-saving manner and can be mounted with low material and work expenditure, it is proposed that the heat exchanger coils of the condenser unit open directly into the collecting flask via a respective connection line.

9 Claims, 10 Drawing Sheets

AIR CONDITIONER FOR PASSENGER TRANSPORTATION VEHICLES

Figure 1:
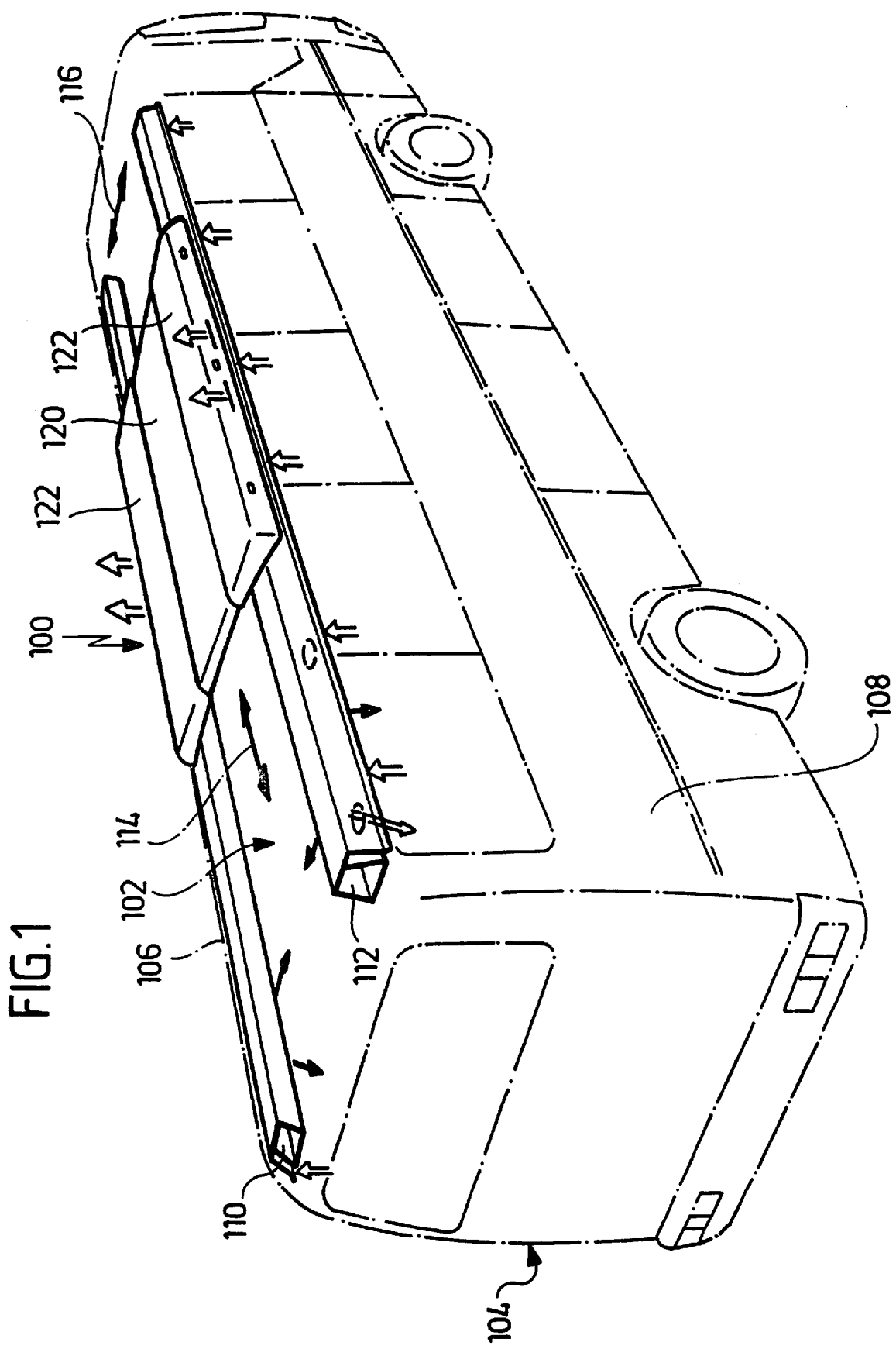

The present invention relates to an air conditioner for passenger transportation vehicles, in particular, for buses, comprising a refrigerant circuit including at least one condenser unit, through which the refrigerant flows in several heat exchanger coils connected parallel to one another, and a collecting flask receiving refrigerant condensed in the condenser unit and serving to compensate the fluctuations in the refrigerant volume occurring during operation of the air conditioner.

The condenser of an air conditioner is also referred to as liquefier.

Such air conditioners are known from the prior art.

In particular, air conditioners are known wherein the heat exchanger coils of the condenser unit, which are connected parallel to one another, open into a collecting pipe, and the collecting flask is connected to the collecting pipe by means of a connection line which is connected to the collecting pipe via a screw connection.

With these known air conditioners it is disadvantageous that the arrangement of the collecting flask on the condenser unit involves material and work expenditure, and the collecting flask arranged at a distance from the end face of the condenser unit requires a comparatively large amount of space.

The object underlying the present invention is, therefore, to create an air conditioner of the kind mentioned at the outset, in which the collecting flask is accommodated in a space-saving manner and can be mounted with low material and work expenditure.

This object is accomplished in an air conditioner having the features of the preamble of claim 1, in accordance with the invention, in that the heat exchanger coils of the condenser unit open directly into the collecting flask via a respective connection line.

Accordingly, in accordance with the inventive concept the collecting pipe into which the heat exchanger coils of the condenser unit open in the known air conditioners is fully dispensed with. Instead, the heat exchanger coils open directly into the collecting flask via their respective connection lines. The collecting flask can, therefore, be arranged directly in front of the end face of the condenser unit and thus be combined with the condenser unit to form a compact unit.

Owing to the elimination of the collecting pipe, material and work time are saved. Furthermore, the number of individual parts of the air conditioner to be kept in storage is reduced.

In a preferred embodiment of the invention, provision is made for the connection lines to be soldered to the collecting flask. This results in a lower leakage rate than with a screw connection.

For the same reason, it is also advantageous for the connection lines to be soldered to the respectively associated heat exchanger coil.

Alternatively, the connection lines can be formed integrally with the respectively associated heat exchanger coil.

To enable the connection lines to be soldered to the heat exchanger coils and the collecting flask, provision is preferably made for the connection lines to be in the form of copper pipes.

In principle, the collecting flask can comprise a single storage container, for example, a storage pipe.

In preferred embodiments of the invention, the collecting flask comprises a plurality of storage containers which are preferably in fluid communication with one another.

To achieve a separation of liquid and gaseous refrigerant in the collecting flask, it is advantageous for the collecting flask to comprise an upper storage container into which the connection lines coming from the heat exchanger coils open, and a lower storage container which includes at least one outlet for liquid refrigerant. Owing to the force of gravity, the liquid refrigerant collects in the lower storage container and can flow off from it, for example, to an expansion valve.

In order for only liquid refrigerant to leave the collecting flask, the outlet for liquid refrigerant is preferably arranged in a lower edge region of the collecting flask.

Furthermore, to ensure that only liquid refrigerant leaves the collecting flask, it is expedient for the lower storage container to be of such dimensions that it is always essentially completely filled with liquid refrigerant during operation of the air conditioner.

In order to be able to compensate the fluctuations in the refrigerant volume in the collecting flask occurring during operation of the air conditioner, in particular, fluctuations on account of density of the refrigerant varying in dependence upon the refrigerant temperature and on account of displacement of the refrigerant to other refrigerant circuit components (e.g. the evaporator), the upper storage container is advantageously of such dimensions that it is always filled partially with liquid refrigerant and partially with gaseous refrigerant during operation of the air conditioner.

The connection lines conducting the condensed refrigerant from the heat exchanger coils of the condenser unit into the collecting flask preferably open into the upper edge region of the collecting flask, which during operation of the air conditioner contains the gaseous phase of the refrigerant.

In order to be able to compensate the fluctuations of the refrigerant volume occurring during operation of the air conditioner, the collecting flask must have a sufficiently large inside volume.

In particular, it has proven expedient for the inside volume of the collecting flask to be at least approximately 10%, preferably at least approximately 15% of the volume of the liquid refrigerant filled into the refrigerant circuit at 25° C. at the boiling point of the refrigerant.

Furthermore, the inside volume of the collecting flask is preferably of such dimensions that during operation of the air conditioner a refrigerant outlet of the collecting flask always remains covered by liquid refrigerant.

For safety reasons, it is advantageous for the collecting flask to be provided with at least one connection for a pressure relief valve, by means of which gaseous refrigerant can escape from the collecting flask when a threshold pressure is exceeded.

It is particularly expedient for the connection for the pressure relief valve to be provided on the upper storage container, which during operation of the air conditioner is filled partially with liquid refrigerant and partially with gaseous refrigerant.

To increase the cooling capacity of the air conditioner it is advantageous for the collecting flask to be connected to an undercooling section of a condenser unit via at least one connection line. In this way, the liquid refrigerant collected in the collecting flask can be cooled down in the undercooling section to a temperature below the boiling temperature of the refrigerant.

In particular, provision may be made for the collecting flask to be connected via several connection lines to a respective undercooling heat exchanger coil of a condenser unit. The refrigerant throughput through the undercooling section of the condenser unit can thereby be increased in a simple way.

A condenser assembly comprising the collecting flask and the at least one condenser unit can be arranged on the roof of the passenger transportation vehicle, in the direction of travel in front of or behind an evaporator of the air conditioner or between two evaporator units of the air conditioner.

If the condenser assembly comprises two condenser units aligned parallel to each other, the collecting flask is preferably arranged symmetrically in relation to the common longitudinal center plane of the condenser units in front of the end faces of the latter.

The condenser assembly with the collecting flask can also be arranged in the trunk of the passenger transportation vehicle.

Further features and advantages of the invention are to be found in the following description and drawings of an embodiment.

Figure 2:
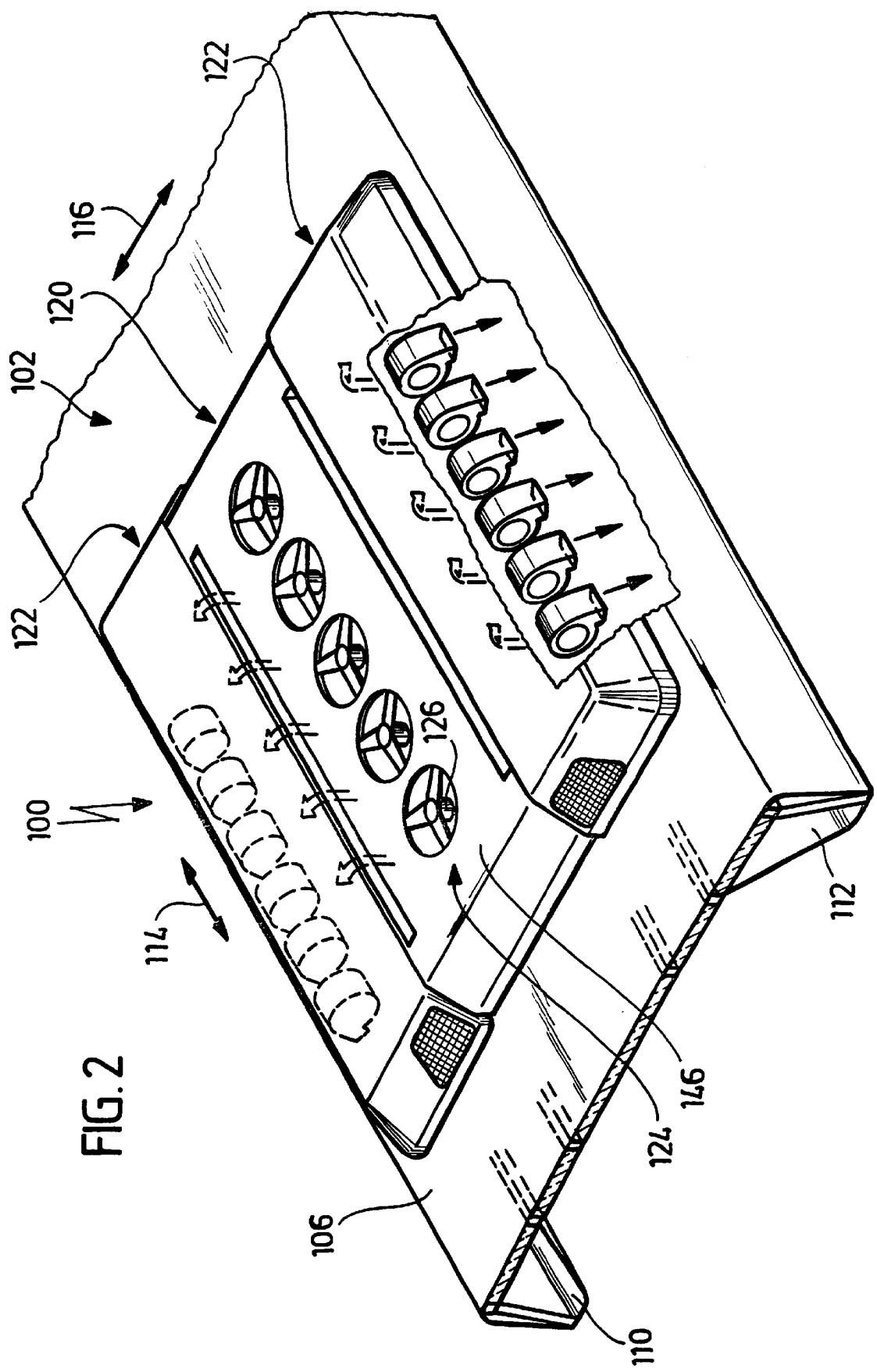
Figure 3:
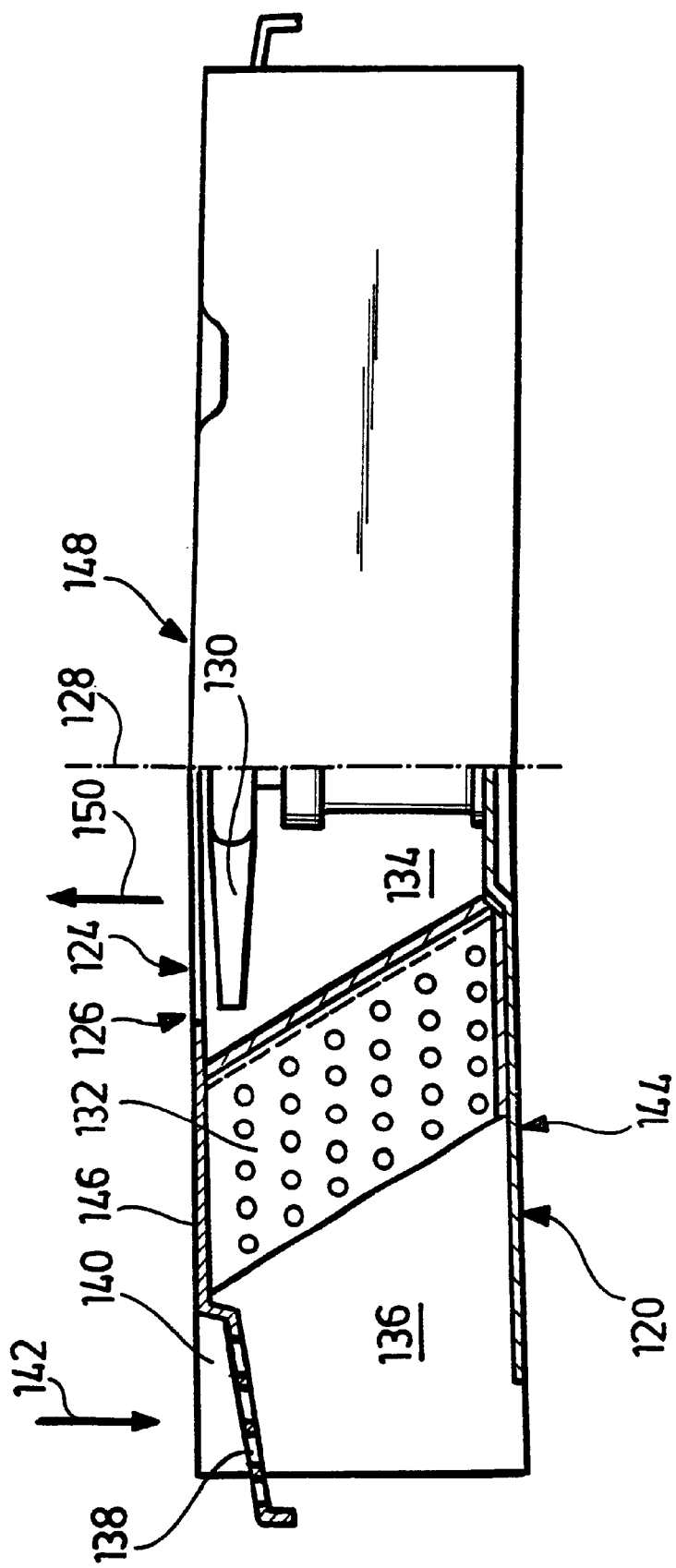
Figure 4:
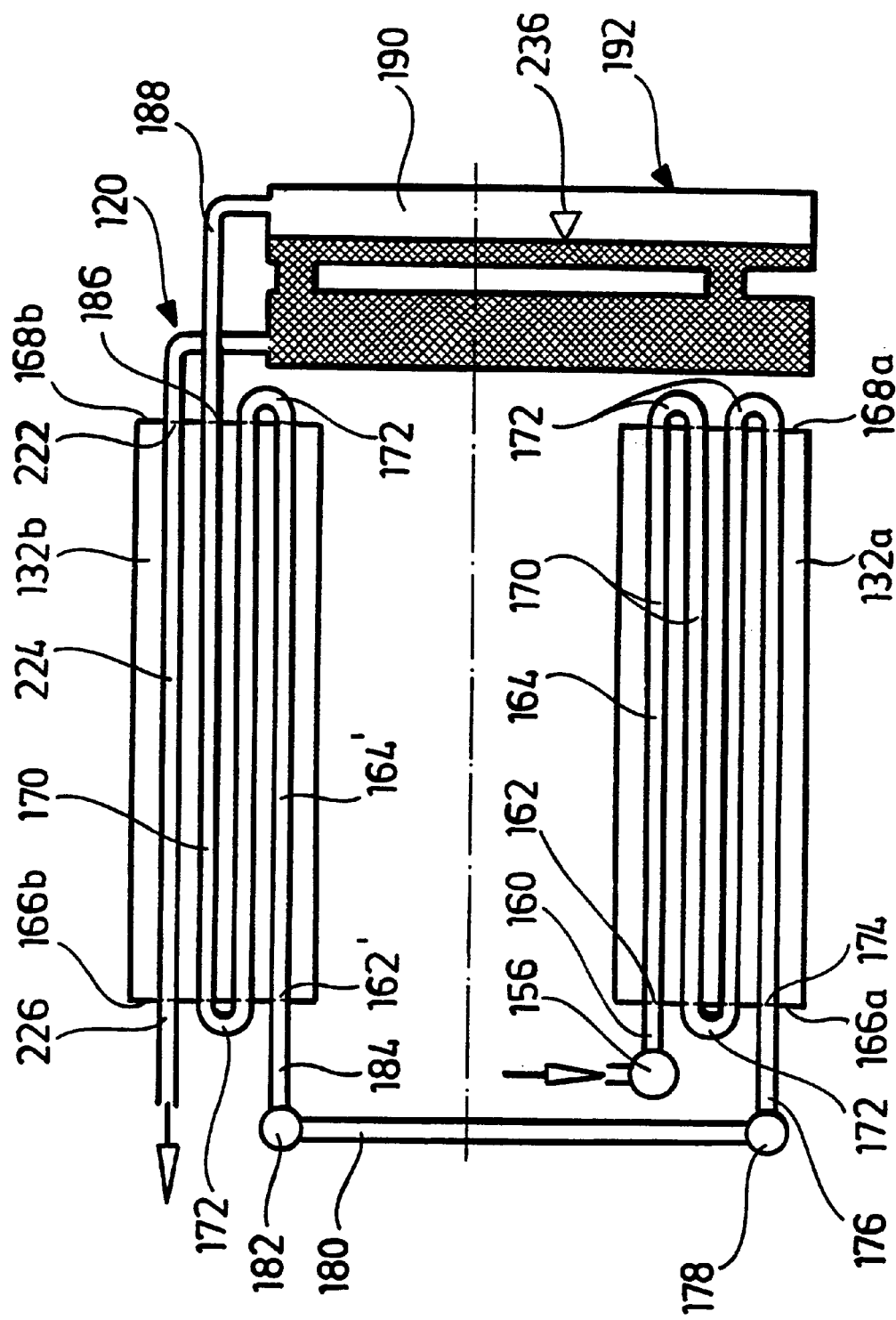
Figure 5:
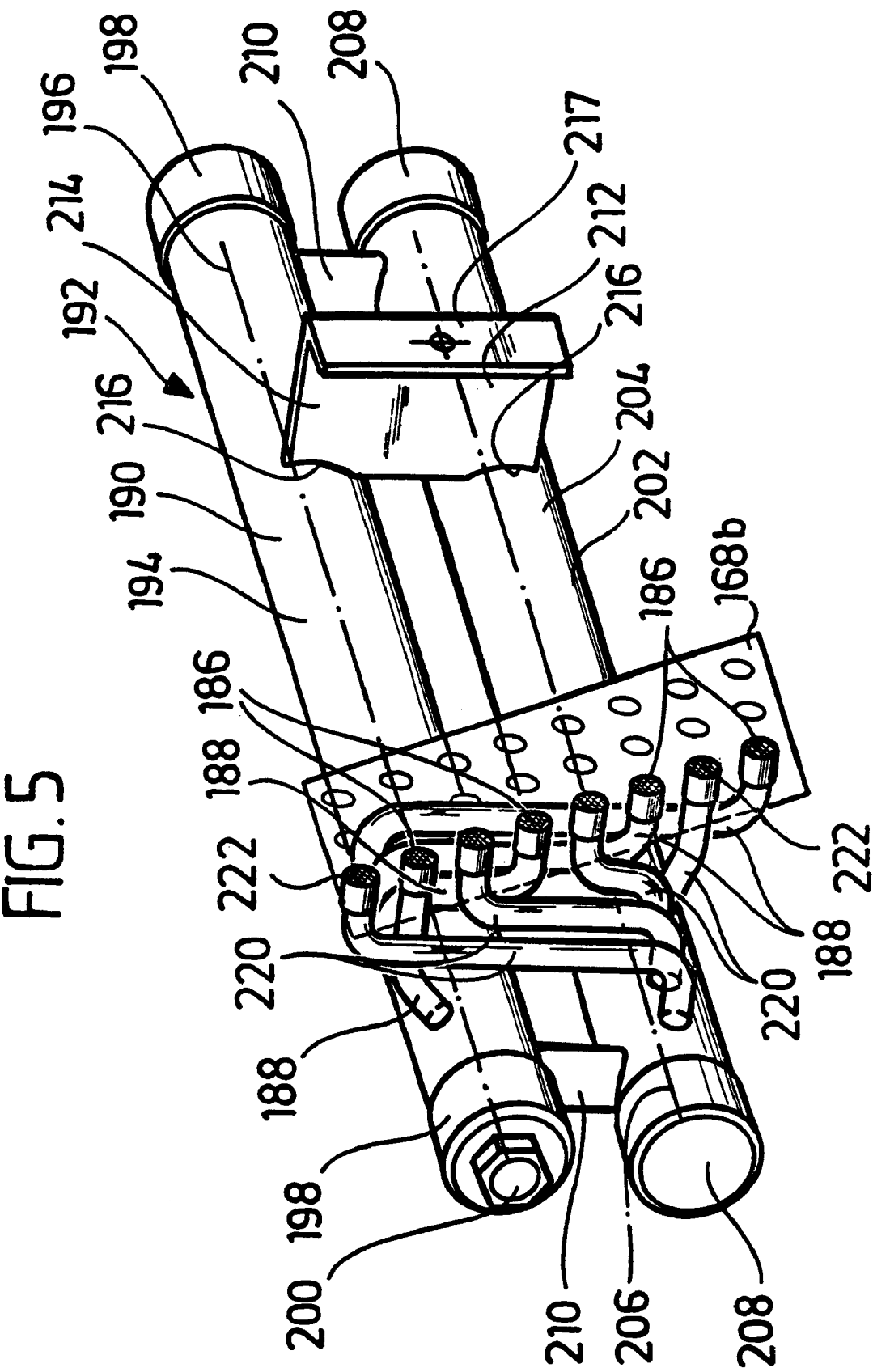
Figure 6:
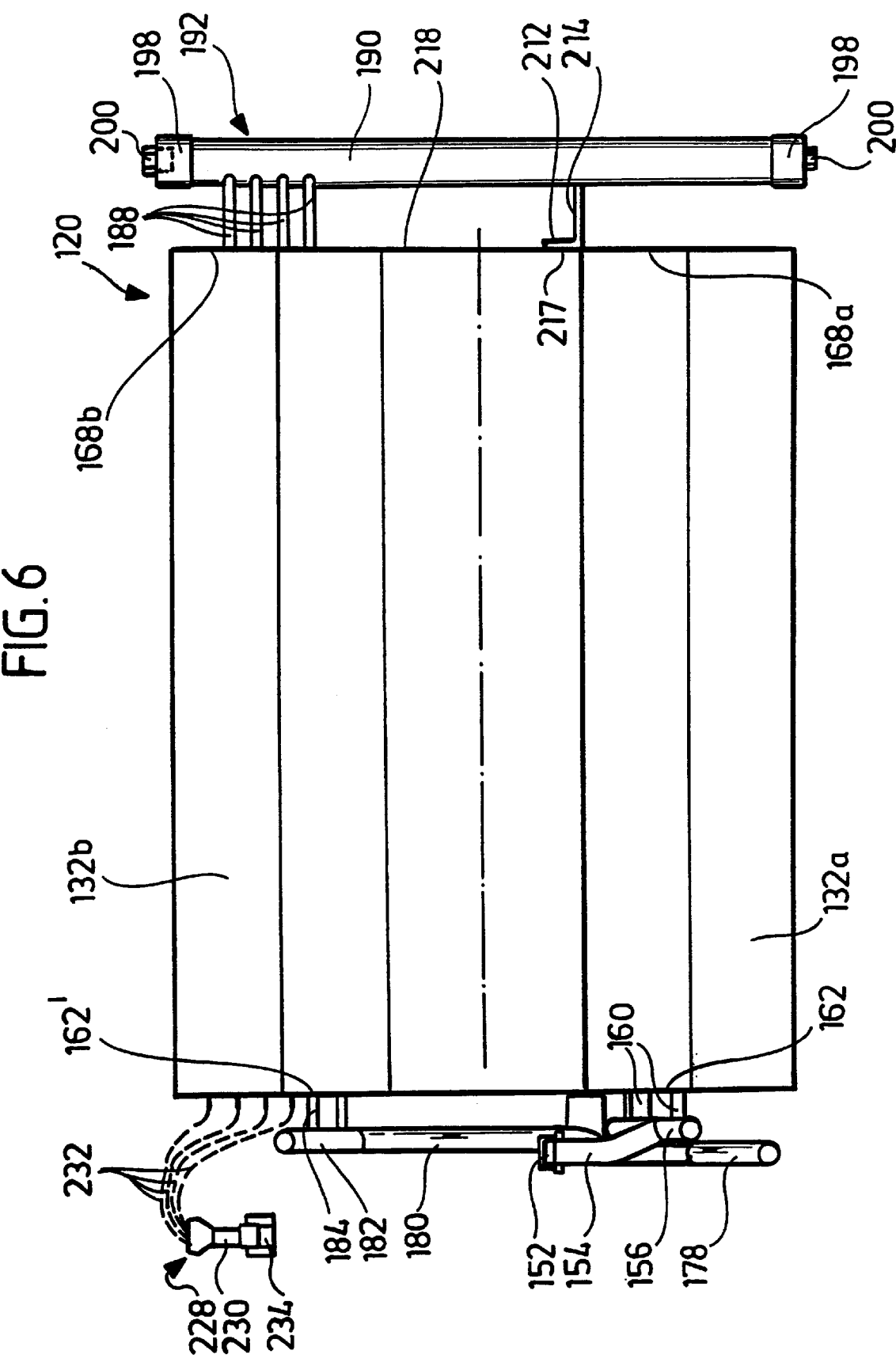
Figure 7:
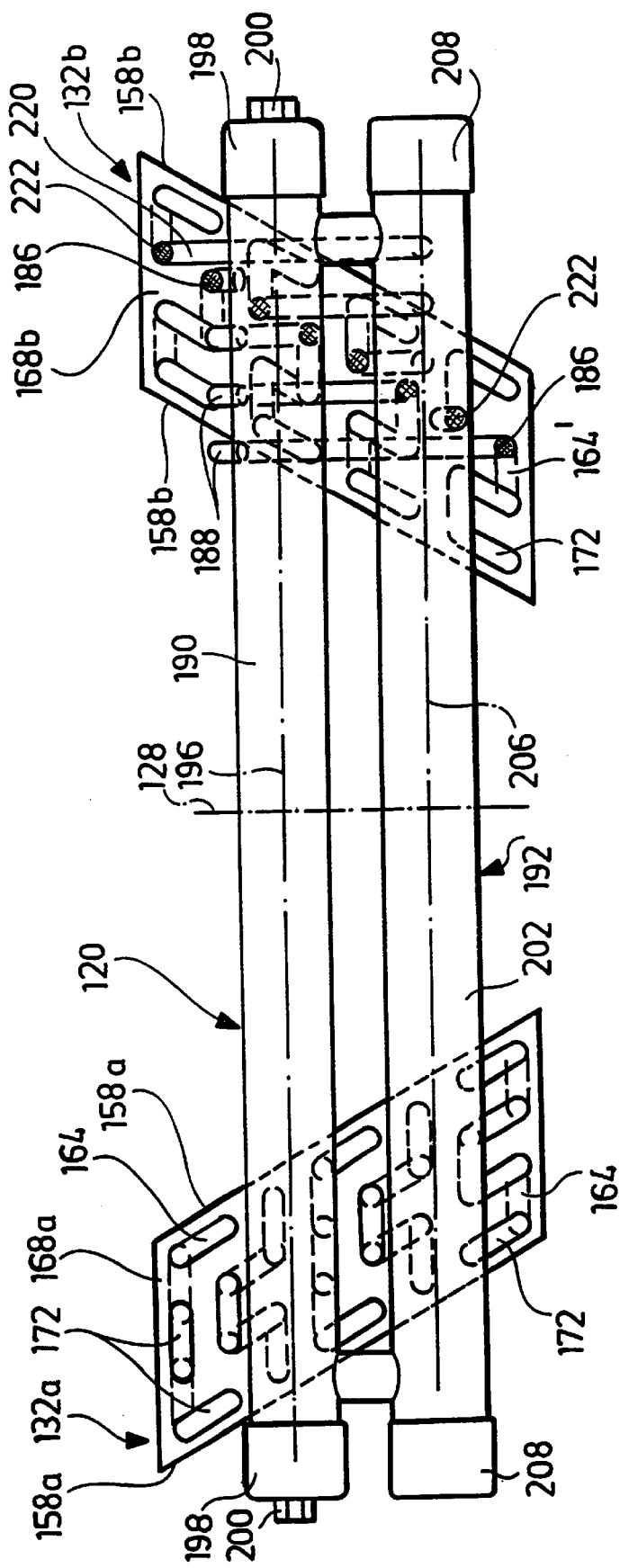
Figure 8:
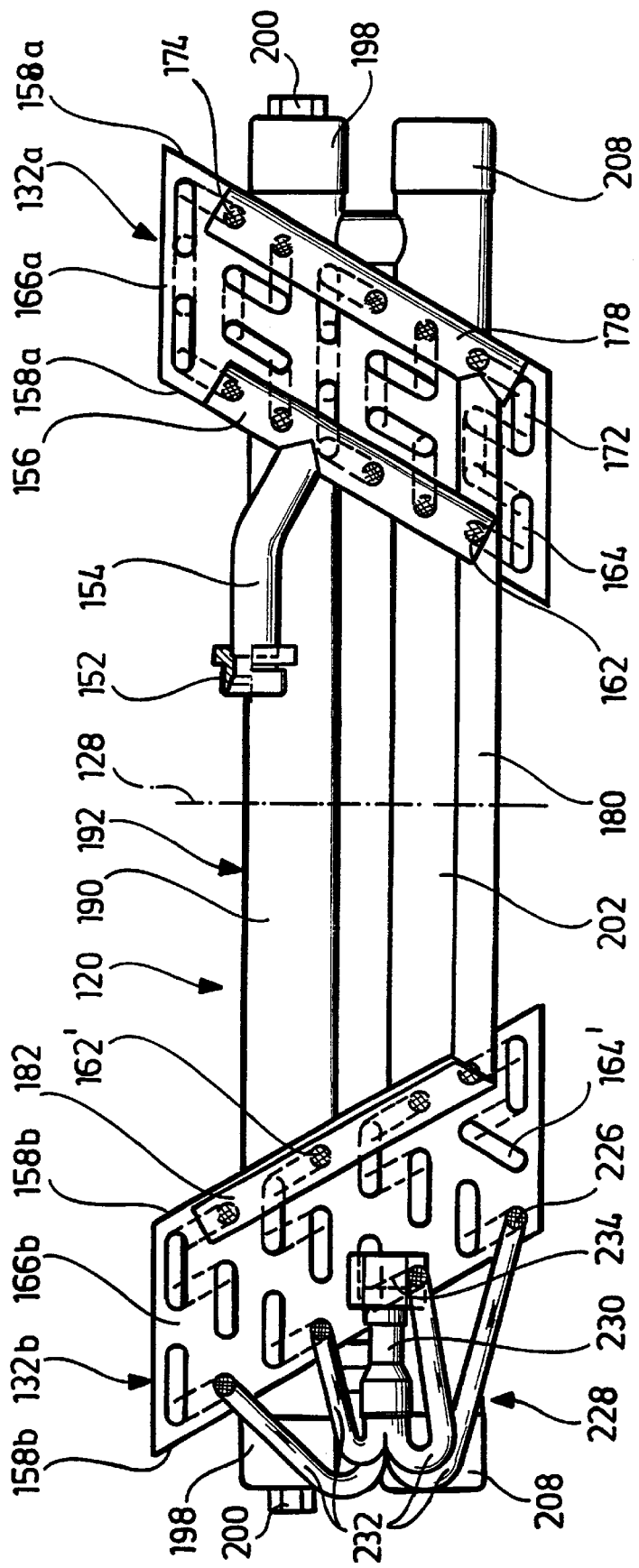
Figure 9:
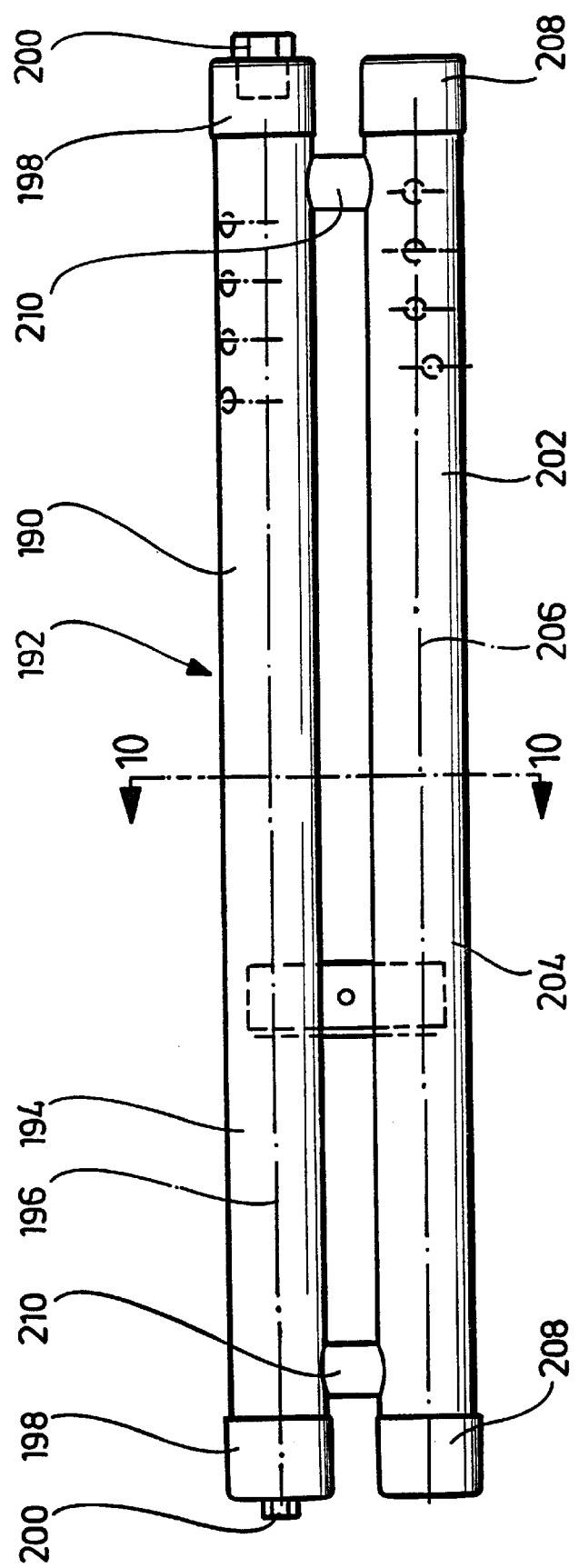

FIG. 1 a schematic perspective overall view of a bus with an air conditioner arranged on the roof of the bus;

FIG. 2 a schematic perspective representation of the air conditioner on the roof of the bus from FIG. 1;

FIG. 3 a schematic cross section through a condenser assembly of the air conditioner from FIG. 2;

FIG. 4 a schematic principle representation of a condenser assembly comprising two condenser units connected in series and a collecting flask;

FIG. 5 a schematic perspective representation of the collecting flask;

FIG. 6 a schematic plan view of the condenser assembly comprising two condenser units connected in series and a collecting flask;

FIG. 7 a rear view of the condenser assembly from FIG. 6 showing the collecting flask and the rear end faces of the condenser units;

FIG. 8 a front view of the condenser assembly from FIGS. 6 and 7 showing the front end faces of the condenser units;

FIG. 9 a side view of the collecting flask without the condenser units; and

Figure 10:
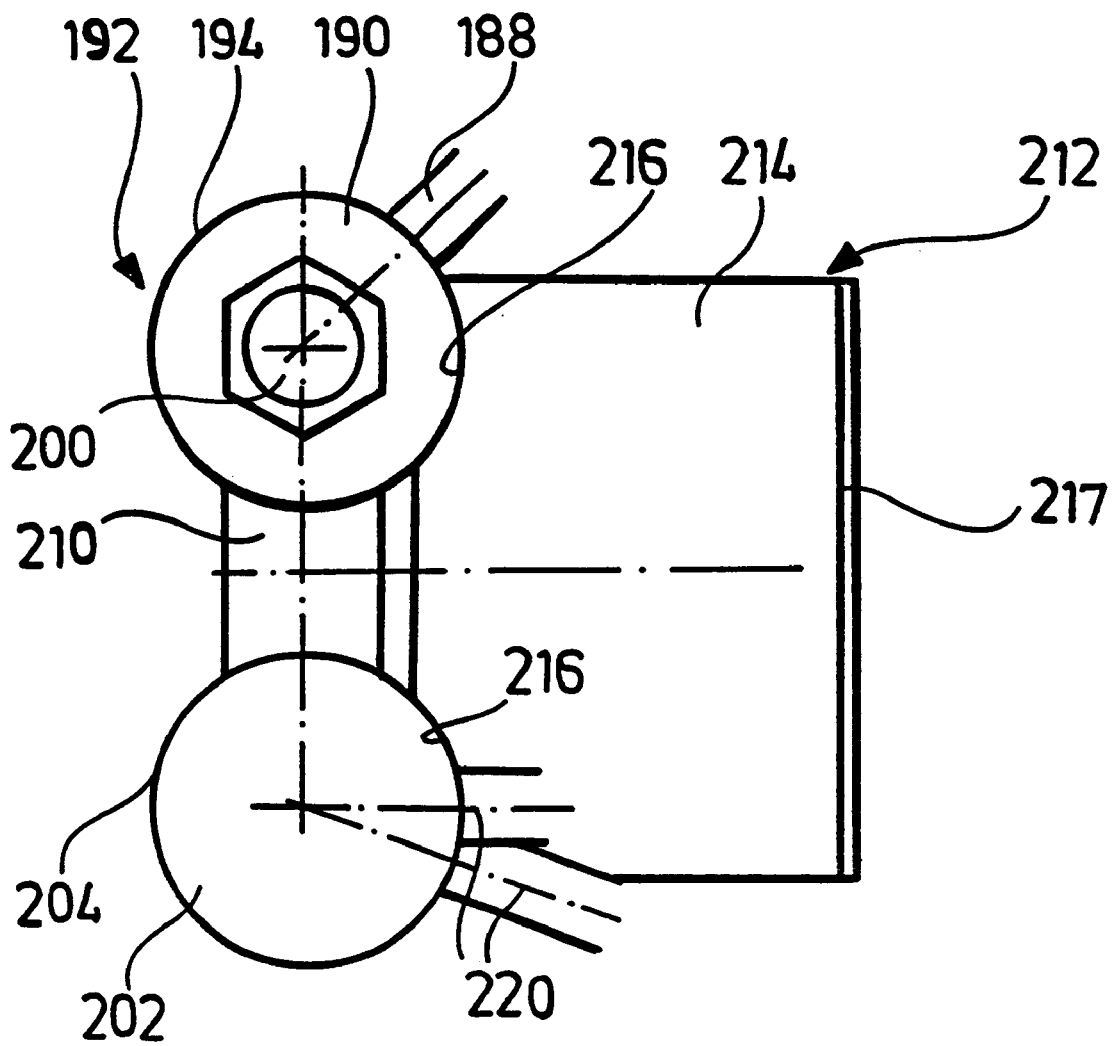

FIG. 10 a cross section through the collecting flask taken along line 10—10 in FIG. 9.

Identical or functionally equivalent elements are designated by the same reference numerals in all Figures.

An air conditioner, generally designated 100, shown in FIGS. 1 to 10, is arranged, as shown in FIGS. 1 and 2, on a roof 102 of a bus, generally designated 104.

Below a roof surface 106 there extend, preferably close to side edges 108 of the bus, or directly adjacent to these, incoming air channels 110 and 112 in the longitudinal direction 114 of the roof, via which incoming air generated by the air conditioner 100 can be distributed in the bus 104.

The incoming air channels 110 and 112 preferably extend essentially over the entire length of the roof 102.

The air conditioner 100 arranged at the center of the bus 104 in the longitudinal direction 114 of the roof extends in the transverse direction 116 of the roof essentially over the entire width of the roof 102, almost as far as the side walls 108 of the bus.

The air conditioner 100 is made up of three assemblies, namely a condenser assembly 120 arranged at the center in the transverse direction 116 of the roof, and two evaporator assemblies 122 arranged at the sides of the condenser assembly 120 and seated on the roof 102 immediately adjacent to the condenser assembly 120.

The condenser assembly 120 comprises, as shown in FIGS. 2, 3 and 6 to 8, a cooling fan unit 124 arranged at the center with respect to the transverse direction 116 of the roof. The cooling fan unit 124 comprises several cooling fans 126 arranged one behind the other in a row in the longitudinal direction 114 of the roof. The fan axes 128 of the cooling fans 126 extend perpendicularly to the roof surface 106, and the cooling fans 126 are preferably in the form of axial fans, in particular, axial ventilators with ventilator vanes 130.

On both sides of the cooling fan unit 124 which extends in the longitudinal direction 114 of the roof there are arranged condenser units 132 which likewise extend in the longitudinal direction 114 of the roof. Viewed in cross section (see FIG. 3), the condenser units 132 are aligned in V-shaped relation to one another, extend at an incline to the roof surface 106 over the entire height of the condenser assembly 120 and separate a cooling air outlet space 134 accommodating the cooling fan unit 124 from a cooling air intake space 136 arranged so as to face the evaporator assemblies 122. A fresh air current 142 enters this cooling air intake space 136 through an intake opening 140 which is arranged on an upper side of the cooling air intake space and is provided with a flow-through grating 138. This fresh air current 142 serves, on the one hand, to cool the condenser units 132 and, on the other hand, can pass into the evaporator assemblies 122 from the cooling air intake space 136.

Both the cooling fan unit 124 and the two condenser units 132 are mounted on a common substructure 144 which, in turn, is mounted on the roof 102. The substructure 144 forms together with an upper cover 146 a condenser assembly housing, generally designated 148, which is open towards the side walls of the evaporator assemblies 122 but at the end face is likewise closed off by the cover 146 so that the operating cooling fans 126 of the cooling fan unit 124 draw exclusively cooling air out of the cooling air intake space 136 into the cooling air outlet space 134 through the condenser units 132 and deliver it upwards in the form of a cooling air current 150 which passes through cooling air outlet openings 152 through the cover 146.

The construction of the condenser assembly 120 of the air conditioner 100 will be described in greater detail hereinbelow with reference to FIGS. 4 to 10.

As best seen from FIGS. 6 and 8, the condenser assembly 120 comprises a hot gas inlet 152 for gaseous refrigerant, which is connected via a connection piece 154 to a distributing pipe 156 which is aligned parallel to the lateral delimiting walls 158a of the first condenser unit 132a.

The distributing pipe 156 is connected via several, for example, five, connection lines 160 to a respective inlet 162 of a respective heat exchanger coil 164 of the first condenser unit 132a.

Each of the, for example, five heat exchanger coils 164 passes through the first condenser unit 132a several times from its front end face 166a to its rear end face 168a and back again, as best seen from FIG. 4, which shows schematically only one of the heat exchanger coils 164.

Each of the heat exchanger coils 164 is comprised of straight sections 170 and of bent sections 172 which are arranged at the end faces 166a, 168a so as to join together successive straight sections 170 of the respective heat exchanger coil 164.

An outlet 174 of each heat exchanger coil 164 is connected via a respective connection line 176 to a collecting pipe 178 which is arranged in front of the front end face 166a of the first condenser unit 132a and is aligned parallel to the lateral delimiting walls 158a of the first condenser unit 132a.

From a lower end of the collecting pipe 178 there leads a horizontal connecting pipe 180 to a lower end of a second distributing pipe 182 which is arranged in front of the front end face 166*b* of the second condenser unit 132*b* and is aligned parallel to the lateral delimiting walls 158*b* of the second condenser unit 132*b*.

The second distributing pipe 182 is connected via several, for example, four, connection lines 184 to a corresponding number of inlets 162' of heat exchanger coils 164' of the second condenser unit 132*b* which are comprised in the same way as the heat exchanger coils 164 of straight sections 170 and bent sections 172.

Each of the heat exchanger coils 164' of the second condenser unit 132*b* ends at a respective outlet 186 in the rear end face 168*b* of the second condenser unit 132*b*.

Connected to each of these outlets 186 is a respective end of a connection line 188 whose other end opens into an upper storage container 190 of a collecting flask, generally designated 192.

As best seen from FIGS. 9 and 10, which show the collecting flask 192 alone, the upper storage container 190 comprises a hollow-cylindrical jacket 194 whose longitudinal axis 196 is aligned horizontally and essentially perpendicularly to the longitudinal axis of the condenser units 132*a*, 132*b* and which is closed at both of its ends by closure caps 198.

A connection 200 for a pressure relief valve (not shown) is provided at each of the two closure caps 198.

The collecting flask 192 further comprises a lower storage container 202 likewise comprising a cylindrical jacket 204 which has a horizontal longitudinal axis 206 aligned parallel to the longitudinal axis 196 of the upper storage container 190 and is closed at both of its ends by closure caps 208.

The interiors of the upper storage container 190 and the lower storage container 202 are connected to each other by two vertically oriented connecting pipes 210 which open at one respective end into the jacket 194 of the upper storage container 190 and at the respective other end into the jacket 204 of the lower storage container 202 and are both arranged close to the closure caps 208, 198 of the storage containers.

Alternatively, only a single connecting pipe or a larger number of connecting pipes can also be provided, which can be arranged at optional locations along the longitudinal axes 196, 206.

As best seen from the perspective representation of FIG. 5, the collecting flask 192 is held in its entirety on a holding angle 212, whose long leg 214 comprises two circular-segment-shaped recesses 216 arranged one above the other for receiving the upper storage container 190 and the lower storage container 202, respectively, and whose short leg 217 is fixed by suitable attachment means on an end wall 218, shown in FIG. 6, which joins the rear end faces 168*a*, 168*b* of the condenser units 132*a*, 132*b* to one another.

As best seen from the perspective representation of FIG. 5, the interior of the lower storage container 202 is connected via several, for example, four, connection lines 220 to a corresponding number of inlets 222 of undercooling heat exchanger coils 224 of the second condenser unit 132*b* (only one of which is shown schematically in FIG. 4).

Each of the undercooling heat exchanger coils 224 comprises an outlet 226 arranged in the front end face 166*b* of the second condenser unit 132*b*. The outlets 226 of all undercooling heat exchanger coils 224 are connected to a spider-like refrigerant distributor 228 (see FIG. 8), which comprises for each outlet 226 a connection line 232 opening into a collecting pipe 230, and at the end of the collecting pipe 230 facing away from the connection lines 232 a refrigerant screw fitting 234 for connection to a refrigerant discharge line (not shown) which leads from the condenser assembly 120 to a thermostatic expansion valve.

Where there are more than four connection lines 220, a further collecting pipe, into which the connection lines 220 open, is preferably provided instead of a spider-like refrigerant distributor.

All of the above-described connection lines, collecting pipes, distributing pipes and heat exchanger coils as well as the collecting flask 192 are preferably made of copper.

The copper connection lines 188 leading from the outlets 186 of the heat exchanger coils 164' to the upper storage container 190 of the collecting flask 192 are soldered to both the heat exchanger coils 164' and the jacket 194 of the upper storage container 190 of the collecting flask 192.

Similarly, the copper connection lines 220 leading from the lower storage container 202 to the inlets 222 of the undercooling heat exchanger coils 224 are soldered to both the jacket 204 of the lower storage container 202 of the collecting flask 192 and the undercooling heat exchanger coils 224.

The cooling fins (not shown) of the condenser units 132*a*, 132*b* are made, for example, of aluminum.

The above-described condenser assembly 120 functions as follows:

When the air conditioner 100 is in operation, gaseous refrigerant enters through the hot gas inlet 152 and the connection piece 154 into the distributing pipe 156, from which it is distributed onto the heat exchanger coils 164 of the first condenser unit 132*a*. While flowing through the heat exchanger coils 164 of the first condenser unit 132*a*, the refrigerant is cooled and partially condensed and flows together again in the collecting pipe 178.

From the collecting pipe 178 the refrigerant passes through the horizontal connecting pipe 180 into the second distributing pipe 182, from which it is distributed onto the heat exchanger coils 164 of the second condenser unit 132*b*.

In the heat exchanger coils 164' of the second condenser unit 132*b*, a further portion of the refrigerant condenses, and the liquefied refrigerant passes through the connection lines 188 from the heat exchanger coils 164' of the second condenser unit 132*b* directly into the upper storage container 190 of the collecting flask 192.

The entire inside volume of the collecting flask 192, which is comprised of the inside volume of the lower storage container 202, the inside volume of the upper storage container 190 and the inside volume of the vertical connecting pipes 210, is selected such that it is of sufficient size to compensate the fluctuations in the refrigerant volume occurring on account of density fluctuations and refrigerant losses during operation of the air conditioner.

Furthermore, the inside volume of the lower storage container 202 is of such dimensions that during operation of the air conditioner 100, the lower storage container 202 is always essentially completely filled with the liquid refrigerant which flows into the lower storage container 202 through the vertical connecting pipes 210 from the upper storage container 290.

For this reason, the level 236 (see FIG. 4) of the liquid refrigerant in the collecting flask 192 is always located within the upper storage container 190 during operation of the air conditioner 100.

If the pressure of the gaseous refrigerant filling out the remaining interior of the upper storage container 190 above the level 236 exceeds a threshold value, excessive gaseous refrigerant is discharged via the pressure relief valves connected to the connections 200 in the closure caps 198 of the upper storage container 190. It is thus ensured that the inside pressure in the collecting flask 192 never gets too high.

Since the level 236 of the liquid refrigerant in the collecting flask 192 always runs through the interior of the upper storage container 190, and the lower storage container 202 is thus completely filled with liquid refrigerant at all times, solely liquid refrigerant passes through the connection lines 220 into the undercooling heat exchanger coils 224 of the second condenser unit 132*b*.

While passing through the undercooling heat exchanger coils 224, the refrigerant which has already condensed is cooled down further to a temperature below its boiling point.

The thus undercooled refrigerant passes from the undercooling heat exchanger coils 224 of the second condenser unit 132*b* through the spider-like refrigerant distributor 228 into the refrigerant discharge line and from there on to the expansion valve.

The present disclosure relates to the subject matter disclosed in application No. 200 09 332.0 of May 24, 2000, the entire specification of which is incorporated herein by reference.

What is claimed is:

1. Air conditioner for passenger transportation vehicles, in particular, for buses, comprising a refrigerant circuit including two condenser units aligned parallel to each other through which the refrigerant flows in several heat exchanger coils connected parallel to one another, and a receiver receiving refrigerant condensed in the condenser units and serving to compensate the fluctuations in the refrigerant volume occurring during operation of the air conditioner, wherein the heat exchanger coils of one of the condenser units opens directly into the receiver via a respective connection line and wherein the receiver is arranged to extend in a horizontal direction in front of the end faces of the two condenser units.

2. Air conditioner as defined in claim 1, wherein the connection lines are soldered to the receiver.

3. Air conditioner as defined in claim 1, wherein the connection lines are soldered to the respective heat exchanger coil associated therewith.

4. Air conditioner as defined in claim 1, wherein the receiver comprises an upper storage container into which the connection lines coming from the heat exchanger coils open, and a lower storage container which has at least one outlet for liquid refrigerant.

5. Air conditioner as defined in claim 4, wherein the lower storage container is of such dimensions that during operation of the air conditioner it is always essentially completely filled with liquid refrigerant.

6. Air conditioner as defined in claim 4, wherein the upper storage container is of such dimensions that during operation of the air conditioner it is always filled partially with liquid refrigerant and partially with gaseous refrigerant.

7. Air conditioner as defined in claim 1, wherein the receiver is provided with at least one connection for a pressure relief valve.

8. Air conditioner as defined in claim 1, wherein the receiver is connected via at least one connection line to an undercooling section of a condenser unit.

9. Air conditioner as defined in claim 8, wherein the receiver is connected via a plurality of connection lines to a respective undercooling heat exchanger coil of a condenser unit.

* * * * *